United States Patent Office 3,468,819
Patented Sept. 23, 1969

3,468,819
PROCESS FOR PRODUCING CELLULAR POLYURETHANES, USING ALKYL OR ARYL ACID PHOSPHATES
John F. Szabat, Pittsburgh, Pa., assignor to Mobay Chemical Company, Pittsburgh, Pa., a corporation of Delaware
No Drawing. Filed Nov. 16, 1964, Ser. No. 411,573
Int. Cl. C08g 22/16, 22/34
U.S. Cl. 260—2.5    8 Claims

ABSTRACT OF THE DISCLOSURE

A process for preparing cellular polyurethane plastics based on a mixture of 5 to 40% by weight of a tertiary nitrogen containing polyol with a polyol which is free of tertiary nitrogen by reaction thereof with an orornanic polyisocyanate in the presence of a blowing agent, an alkyl acid phosphate and hydrolyzable chlorides. The acid phosphate must be present in an amount in the range of 0.2% to 2% by weight based on the weight of the organic polyisocyanate and there must be 0.01% to 1% by weight of hydrolyzable chloride. The amounts of both the alkyl acid phosphate and the hydrolyzable chloride combined must be at least 0.75% by weight based on the weight of the organic polyisocyanate.

---

This invention relates to cellular polyurethane plastics and more particularly to improved cellular polyurethane plastics which are based at least in part on tertiary nitrogen containing polyols.

In Canadian Patent 661,534, it is proposed to prepare a cellular polyurethane in simple mixing apparatus by reacting an organic polyisocyanate in the presence of a blowing agent with a salt of a tertiary nitrogen containing polyol and either an organic carboxylic acid or an alkyl phosphoric acid. A critical feature of the patented process is the use of a salt which is either neutral or acid. Thus, the salt is prepared from 1 to 4 equivalents of acid per equivalent of tertiary nitrogen in the polyol. The patent also proposes the use of mixtures of tertiary nitrogen containing polyols with polyols which are free from tertiary nitrogen. It has been found in practicing the process of the prior art that when more than about 5% of the mixture of polyols is one which contains a tertiary nitrogen atom, the cellular polyurethanes produced in conjunction with one equivalent of the acid or more are not satisfactory.

The mixture of polyols which contains 5% of tertiary nitrogen containing polyol reacted with one equivalent of a mixture of n-butyl acid phosphate, for example, yields polyurethane foams which fail to develop sufficient gel strength at the critical time in the course of their preparation to produce cellular polyurethanes which have good physical properties. This is particularly evident in the preparation of large blocks where the foam has fissures and voids caused by the insufficient gel strength of the mixture. The problem cannot be solved by merely increasing the catalyst. The problem is also evident where rigid cellular polyurethanes are applied by pour-in-place techniques when molding panels in thin sections to heights of four feet or more. In the thin section molding, the foam near the top of the rise has a non-uniform cell structure when 5% or more of tertiary nitrogen containing polyol is used in conjunction with 1 to 4 equivalents of the acid. When subjected to low temperature of −10° F. or below, these foams shrink and lose some of their insulating character.

It is therefore an object of this invention to provide cellular polyurethane plastics which have improved physical properties which are based on polyols containing tertiary nitrogen atoms. Another object of this invention is to provide cellular polyurethane plastics which have improved physical properties and which are based on polyols containing tertiary nitrogen atoms, said foams containing a critical amount of an acid phosphate. Another object of this invention is to provide improved rigid cellular polyurethane plastics which have reduced tendency to shrink at low temperatures, which have improved ability to resist discoloration and which have improved physical properties in other respects. Another object of this invention is to provide an improved method of preparing rigid cellular polyurethane plastics based on mixtures of organic polyisocyanates and polyols which contain tertiary nitrogen atoms. Still a further object of this invention is to provide an improved method of preparing rigid cellular polyurethane plastics based on components which contain an alkyl acid phosphate. Still another object of this invention is to provide cellular polyurethane plastics containing alkyl acid phosphates which do not have a tendency to form fissures due to low gel strength in the course of the preparation. A further object of this invention is to provide rigid cellular polyurethane plastics which can be used to prepare a uniform core in insulated panels.

The foregoing objects and others which will become apparent from the following description are accomplished in accordance with this invention, generally speaking, by providing cellular polyurethane plastics prepared by reacting an organic polyisocyanate with a polyol containing a tertiary nitrogen atom in the presence of an acid phosphate in an amount of from 0.2% to 2% by weight of the isocyanate and less than one equivalent per equivalent of tertiary nitrogen. The tertiary nitrogen containing polyol accounts for at least 5% by weight of the total polyol present, preferably 5 to 40%. Therefore, this invention contemplates the preparation of improved rigid cellular polyurethane plastics by reacting an organic polyisocyanate and particularly a mixture of isocyanates containing some di- and some tri- and/or higher polyisocyanate with tertiary nitrogen containing polyols per se as well as mixtures of more than 5% by weight with polyols which are free from tertiary nitrogen and from about 0.2% to about 2% by weight of an alkyl acid phosphate or an aryl acid phosphate, based on the weight of the isocyanate.

If the tertiary nitrogen containing polyol accounts for less than 5% by weight of the total polyols present, the resulting cellular polyurethane will not expand to fill a cavity in a reasonable amount of time unless additional catalyst is used. Further, less than 5% of the tertiary nitrogen containing polyol results in products which shrink at low temperatures even with the improvements of the present invention.

In accordance with a preferred embodiment of the invention, two factors are adjusted and a synergistic effect is obtained which avoids both shrinkage of the foam at low temperature and discoloration of the center of the block of foam. In accordance with this preferred embodiment from about 0.2 to about 2% by weight of an alkyl or aryl acid phosphate is used while the hydrolyzable chloride is adjusted to about 0.01% to about 1% by weight, with the further proviso that at least about 0.75% by weight, based on the weight of the isocyanates of the combined hydrolyzable chloride and alkyl or aryl acid phosphate are present. This system then involves the use of a polyether polyol containing tertiary amino groups (at least 5% by weight of the total polyol mixture), an organic polyisocyanate which preferably contains from about 0.01 to about 1% hydrolyzable chlorides and from about 0.2% to about 2% by weight of an alkyl or aryl acid phosphate. The alkyl or aryl acid phosphate may be added to any component in the system. Thus, it may be added to the isocyanate either by simple mixing at room temperature or it may be mixed with the isocyanate and then heated at a temperature up to about 75° C. for about 15 minutes to about 2 hours or even longer in order to cause it to pre-react with the isocyanate. It is not known exactly what product is formed when the alkyl acid phosphate reacts with the isocyanate. It is believed that the product may result from reaction of the —NCO groups with the —OH groups of the acid phosphate. It is also possible, however, where hydrolyzable or in other words, carbamyl chlorides are present in the isocyanate that the acid phosphate may react with this group and form a compound. It is not known whether these compounds are stable or not and it is not believed to matter. The compounds or mixture as the case may be gives the same result. It is also possible to mix the alkyl or aryl acid phosphate with the component which contains the polyol or any other component. Moreover, it may be pre-reacted with the tertiary nitrogen atoms in the polyol. It is an essential feature of the invention, however, that no more than 2% by weight of the total weight of the isocyanate be the alkyl or aryl acid phosphate. Greater amounts for some reason interfere with the foaming reaction and result in splits or fissures at the center of the foam block. On the other hand, less than 0.2% of the alkyl or aryl acid phosphate is insufficient to avoid discoloration of the core of the block of foam and the shrinkage when the foam is subjected to low temperatures for example, $-10°$ F., $-40°$ F. and $-70°$ F. for one week or longer.

It is not possible to avoid all of the shrinkage probelms set forth above by merely using increasing amounts of hydrolyzable chloride because amounts of hydrolyzable chloride which solve the shrinkage problem cannot be tolerated in the isocyanate. It is never possible with mere adjustment of the hydrolyzable chlorides to achieve a satisfactory reduction of both shrinkage and discoloration at the core of the block. This can only be achieved by the combined use of both the hydrolyzable chloride and alkyl or aryl acid phosphates in the ranges set forth above.

In the prior art process where the alkyl or aryl acid phosphates have been used to retard the reaction between the organic polyisocyanate and a polyol, including polyols which contain tertiary nitrogen atoms, it has not been possible to prepare satisfactory foams unless amounts of alkyl or aryl acid phosphates and preferably amounts of hydrolyzable chlorides within the ranges set forth above are used. Therefore, a preferred embodiment of the invention involves foam formulations which contain amounts of hydrolyzable chloride and acid esters of phosphoric acid within the foregoing ranges based on the isocyanate. A particularly suitable and preferred way of adding the hydrolyzable chloride and acid phosphate to the foam is to first add it to the isocyanate and use this produce as the reactant for the preparation of the cellular polyurethan plastic.

When both the hydrolyzable chloride and the acid ester of phosphoric acid are adjusted within the foregoing ranges, one obtains a polyurethane foam on reaction with the polyol which does not exhibit either shrinkage at low temperatures of $-10°$ F. or below, or discoloration in the core of the block. Outside the ranges set forth above severe shrinkage results at low temperatures or the core of the block is discolored. Where both the shrinkage and the discoloration at the center of the block are to be avoided, it is essential to operate inside the range set forth above, i.e. between 0.01 and 1% hydrolyzable chloride and 0.2 to 2% of the acid ester of phosphoric acid, said percentage based on the weight of the isocyanate and with the proviso that at least 0.75% by weight of the weight of the isocyanate is made up of the hydrolyzable chlorides and acid ester of phosphoric acid.

Still another factor in the production of satisfactory cellular polyurethanes is the heat generated and retained by the product during the reaction. The reaction is exothermic and the highest temperature or exotherm should never exceed 190° C. It is preferred that the exotherm be between 100 and 190° C.

Any suitable acid ester of phosphoric acid may be used, such as, for example, monoamyl acid phosphate, mono-n-butyl acid phosphate, monoethyl butyl acid phosphate, monoisopropyl acid phosphate, mono-methyl acid phosphate, mono-phenyl phosphate, mono-n-propyl acid phosphate, mono-n-octyl acid phosphate, diamyl acid phosphate, di-n-butyl acid phosphate, di-ethyl butyl acid phosphate, di-isopropyl acid phosphate, dimethyl acid phosphate, diphenyl acid phosphate and the like. A particularly preferred acid phosphate is the commercial mixture which contains about 40% mono-n-butyl acid phosphate and about 60% di-n-butyl acid phosphate.

The hydrolyzable chloride in the isocyanate may be adjusted by adding hydrochloric acid to the isocyanate or an acid chloride such as benzoyl chloride, phthaloyl chloride, adipoyl chloride, $PCl_3$, and the like may be added.

Any suitable organic polyisocyanate may be used including both monomeric organic polyisocyanates and polymeric organic polyisocyanates. The organic moiety may be aliphatic, aromatic or heterocyclic including acyclic, alicyclic, aromatic and heterocyclic radicals. Suitable monomers are therefore ethylene diisocyanate, ethylidene diisocyanate, propylene - 1,2 - diisocyanate, cyclohexylene-1,2-diisocyanate, propylene-1,2-diisocyanate, cyclohexylene-1,2-diisocyanate, m-phenylene diisocyanate, 2,4-toluylene diisocyanate, 2,6-toluylene diisocyanate, 4,4'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dicyclo-4,4'-biphenylene diisocyanate, p,p',p"-triphenylmethane diisocyanate, 1,5-naphthalene diisocyanate, furfurylidene and the like. Any suitable polymer form of isocyanate or mixture of polyisocyanates may be used, included are those mixtures obtained by phosgenating the reaction product of aniline with formaldehyde to obtain a mixture of di-, tri-, tetra- or even higher polyisocyanates for example as disclosed in U.S. Patent 2,683,730. In addition to the isocyanates disclosed in that patent, one may use similar isocyanates which contain a higher percentage of organic diisocyanate. These isocyanates may be referred to generally as polyphenyl polymethylene polyisocyanates. It is preferred to use those polyphenyl polymethylene polyisocyanates which contain from about 40 to about 60% of a diphenylmethane diisocyanate, preferably 4,4'-diphenylmethane diisocyanate and from about 20 to 30% triisocyanate having the formula

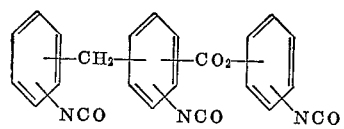

and the balance higher polyisocyanates. These isocyanates could be represented by the general formula

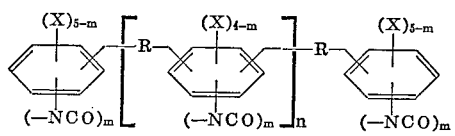

in which R is an organic radical and preferably an aliphatic radical obtained by removing the carbonyl oxygen from an aldehyde or ketone and is preferably —$CH_2$—, $m$ is 1 or 2, X is halogen, lower alkyl or hydrogen and $n$ is 0, 1, 2, or 3. The aliphatic radical, R, in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $CH_3$—CO—$CH_3$, the radical remaining is

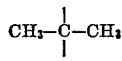

When X is halogen, it may be any suitable halogen, but is preferably chlorine or bromine and further, it is preferred that the amount of chlorine or bromine fall between about 1% and 15% by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. This, $n$ in the formula preferably has a value of from about 0.1 to about 1.5. To illustrate, in a mixture of isocyanates of the above formula containing 90% diisocyanate and 10% triisocyanate, $n$ would have a value of 0.1. For a mixture containing 20% di-, 30% tri-, 30% tetra- and 20% penta-isocyanate, the average value of $n$ would be 1.5. A most preferred value for $n$ is between about 0.85 and about 1.1 with about 40% to about 60% of the mixture of polyisocyanates being a diisocyanate.

Isocyanates of the above formula are well known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37% $CH_2O$) and about 74 parts of HCl (aqueous, 30% HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31% free —NCO is obtained. The free excess phosgene and substantially all of the solvents used, if any, are then removed.

A specific product of this type is obtained by phosgenating the reaction product of aniline with formaldehyde, said mixture of organic polyisocyanates having the formula

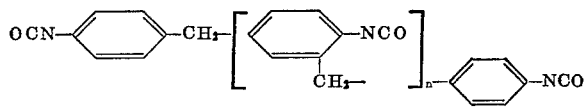

wherein $n$ has an average value of 0.88 and contains about 50% diisocyanate and about 21% triisocyanate, the balance being tetra- and penta-isocyanates sufficient to give $n$ a value of 0.88.

Still another type of product which is particularly adapted to use in accordance with the present invention is based on toluylene diisocyanates and the polyaryl polyalkylene polyisocyanates containing both diisocyanates and triisocyanates as set forth above. Any suitable mixture of tolylene diisocyanate and the polyaryl polyalkylene polyisocyanate may be used. It is desirable to use from 10 to 90% of toluylene diisocyanate and a particularly preferred mixture is one which contains at least 50% by weight of a polyphenyl polymethylene polyisocyanate and about 35 to 50% by weight toluylene diisocyanate which is preferably a mixture of about 80% 2,4- and 20% 2,6-toluylene diisocyanate.

The isocyanates preferably contain very little heavy metal preferably less than 200 parts/million. It is particularly preferred that the isocyanate have less than 200 parts/million of iron since iron has an effect on the flame resistance of the product.

Any suitable polyol which contains a tertiary nitrogen atom may be used. The polyols which are preferably employed in accordance with the invention are made by reacting an alkylene oxide with a primary or secondary amine which has at least two amino hydrogen atoms that will react with the alkylene oxide to form a polyol. Any suitable amine may be used including, for example, ethylene diamine, 2,4-toluylene diamine, 1,3-propylene diamine, 4,4-diamino diphenyl methane diamine, p-phenylene diamine, 1,4-butane diamine, 1,6-hexamethylene diamine, diethylene triamine, triethylene tetramine and the like. Any suitable alkylene oxide may be used such as, for example, ethylene oxide, 1,2-propylene oxide, 1,2-butylene oxide, 2,3-butylene oxide, epichlorohydrin, styrene oxide and the like. The tertiary nitrogen containing polyols to be used in accordance with the invention preferably have from 3 to 8 hydroxyl groups and preferably have a molecular weight of from 175 to about 1000.

In accordance with the invention it is possible to use the tertiary nitrogen containing polyols in conjunction with an additional active hydrogen containing compound which is also preferably a polyol. For this purpose any suitable active hydrogen containing compound which has active hydrogen containing atoms as determined by the Zerewitinoff method may be used which preferably have a molecular weight of 175 to 1000. It is preferred to use polyols including polyesters, polyethers or polythioethers. Any suitable polyester may be used which contains free hydroxyl groups and which is obtained, for example, from a polycarboxylic acid and a polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol sorbitol and the like.

Any suitable polyether may be used such as, for example, those obtained by reacting one of the alkylene oxides set forth above with a polyol such as, for example, ethylene glycol, propylene glycol, trimethylolpropane, glycerine, pentaerythritol, sorbitol, 1,2,6-hexane triol, alpha-methyl-d-glucoside and the like. One may also react alkylene oxides with water in order to obtain the polyether polyols. Any suitable polythioether polyol may be used, for example, those prepared by the condensation of thiodiglycol or by reacting an alkylene oxide with thiodiglycol as more particularly set forth above.

In addition, one may use reaction products of phosphoric acid with a polyhydric alcohol or phosphorous-containing polyols which are prepared by reacting a half ester of an unsaturated carboxylic acid and a polyhydric alcohol with a trialkyl phosphite. It is preferred that phosphorous-containing polyols also contain nitrogen and suitable phosphorous-containing polyols which also contain nitrogen having the formula:

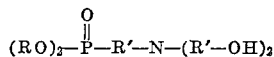

where R and R' have the meanings given above may be used. A preferred compound is dioxyethyl-N,N-bis(2-hydroxyethyl) amino methyl phosphonate,

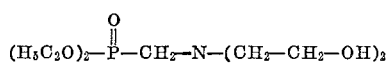

The preferred hydroxyl number for the resin mixture is from about 300 to 600, most preferably 350 to 450 to yield best flame resistance and physical properties including dimensional stability.

In accordance with still another preferred embodiment of this invention, it is possible to chemically combine the phosphorous-containing compound with the above-menitoned active hydrogen containing compounds which do not contain phosphorous so that a composite product results which is made up on a weight basis of from about 20 to about 90 and preferably 30 to 60 parts of the phosphorous-containing basic structure, the balance being a skeleton of organic compound containing active hydrogen containing groups. Thus, for example, one may take a polyhydric polyalkylene ether, polyester, polythioether, polyamine or the like and react it with one of the phosphorous containing compounds set forth above to prepare a composite type of product. To illustrate a specific example, one may modify pentaerythritol with both propylene oxide and dioxyethyl-N,N-bis-(2-hydroxy ethyl amino methyl) phosphonate to prepare a product having an hydroxyl number of from about 200 to about 600 containing from about 20 to about 90 parts by weight of the phosphonate and the balance pentaerythritol and propylene oxide adduct thereof. It is preferred that these composite phosphorous containing polyols have from 3 to 8 free hydroxyl groups.

When preparing a cellular polyurethane plastic in accordance with the invention, one should provide a blowing agent which causes the reaction mixture to expand by the generation of gas during the isocyanate-polyaddition reaction. The blowing agent may be water which reacts with isocyanate to produce carbon dioxide which blows the reaction mixture. Alternately, a temperature-sensitive blowing agent may be used such as, for example, a halohydrocarbon including trichlorofluoromethane, dichlorofluoromethane, trichlorotrifluoromethane, dichlorodifluoromethane and the like or an alkane such as butane, hexane, heptane, or the like, methylene chloride or any other suitable blowing agent.

It is sometimes desirable to carry out the reaction for the preparation of a cellular polyurethane plastic in the presence of a catalyst. As pointed out above, one should avoid iron compounds where flame resistance is desired. When the polyols used for the reaction contain a tertiary nitrogen atom, it is often not necessary to have any added catalyst. It may be desirable to add a catalyst which may be either a tertiary amine or a tin salt of a carboxylic cid. Suitable catalysts of the tertiary amine type include triethylene diamine, tetramethyl quanidine, N,N-diethyl-3-diethyl propyl amine, N-methyl morpholine, N-ethyl morpholine, diethyl ethanol amine, N-coco morpholine, 1-methyl-4-dimethyl aminoethyl piperazine, 3-methoxy-N-dimethyl propyl amine, N-dimethyl-N'-methyl isopropyl propylene diamine, dimethyl benzyl amine, per-methylated triamine and the like. Suitable tin salts are stannous octoate, stannous oleate, dibutyl tin-di-2-ethyl hexoate and the like.

It is very desirable to have a foam stabilizer present in the course of the reaction and here one may use any suitable foam stabilizer including polydimethyl siloxane and preferably one having a viscosity between about 20 and about 200 centipoises at 25° C. or an alkyl silane polysiloxane polyoxyalkylene block copolymer such as, those disclosed in U.S. Patent 2,834,748. A preferred alkyl silane poly siloxane polyoxyalkylene block copolymer is within the scope of the formula:

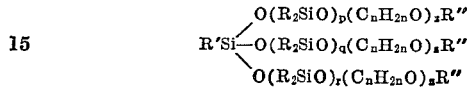

wherein R, R' and R" are alkyl radicals having 1 to 4 carbon atoms, $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34.

One may also use sulphonated castor oil as the foam stabilizer substance.

Therefore, the invention provides for the production of improved rigid cellular polyurethane plastics which are based on tertiary nitrogen containing polyols and preferably mixtures of organic polyisocyanates by using in addition thereto critical amounts of alkyl acid phosphates and hydrolyzable chloride, one may obtain rigid cellular polyurethanes adapted to be used as insulation for the walls, for example, for insulation of railroad cars and trucks or other refrigerators without the shrinkage at low temperature and discoloration at the core of the block of foam. Moreover, by using the critical amounts of acid esters of phosphoric acid taught in this application, it is possible to avoid the poor physical properties apparent at the center of the block in the form of fissures, splits and the like.

The invention is further illustrated by the following examples in which parts are by weight unless otherwise specified.

The working examples are summarized in the following table wherein the polyol free from tertiary nitrogen set forth in the table is pre-mixed with a tertiary nitrogen containing polyol, additional amine catalyst, as applicable, silicone oil, which is every case is one having the formula

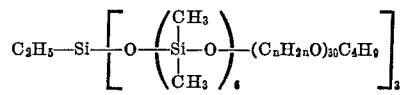

wherein $(C_nH_{2n}O)$ is a mixed polyoxyethylene and oxypropylene block copolymer containing about 17 oxyethylene units and 13 oxypropylene units and a blowing agent which in every case is trichlorofluoromethane( R–11 in the table) to prepare Component I. Component II is made up by mixing together the isocyanate or mixture of isocyanates set forth in the table with a mixture of 40% mono-n-butyl acid phosphate and 60% di-n-butyl acid phosphate, the hydrolyzable chloride of the mixture of isocyanate being adjusted according to the level set forth in the table. The two components are rapidly and intimately mixed together on a machine mixer as disclosed in U.S. Reissue Patent 24,514. The reaction mixture is discharged into a mold where the cream time, rise time and exotherm are measured. The foam is allowed to cure at room temperature overnight and inspected for discoloration, shrinkage, and fissures particularly at the center of the block.

| | Component I | | | | | | | Component II | | | | | |
|---|---|---|---|---|---|---|---|---|---|---|---|---|---|
| | Polyol | | Silicone oil | Catalyst | | | R-11 | Isocyanate | | H. C. parts in isocyanate | BAP parts in isocyanate | H. C. percent in isocyanate | BAP percent in isocyanate |
| | A | B | | A | B | C | | A | B | | | | |
| Examples: | | | | | | | | | | | | | |
| 1 | 95 | 5 | 2 | | | | 26 | | 87.0 | 0.087 | 0.00 | 0.1 | 0.00 |
| 2 | 95 | 5 | 2 | | | | 26 | | 87.99 | .087 | 0.99 | .098 | 1.125 |
| 3 | 95 | 5 | 2 | | | | 26 | | 88.98 | .087 | 1.98 | .097 | 2.275 |
| 4 | 95 | 5 | 2 | | | | 26 | | 90.96 | .087 | 3.96 | .095 | 4.353 |
| 5 | 95 | 5 | 2 | | | | 26 | | 91.95 | .087 | 4.95 | .094 | 5.383 |
| 6 | 95 | 5 | 2 | | | | 26 | | 92.94 | .087 | 5.94 | .093 | 6.391 |
| 7 | 85 | 15 | 2 | 1 | 1 | | 23 | | 87.00 | .087 | 0.00 | .100 | 0.000 |
| 8 | 85 | 15 | 2 | 1 | 1 | | 23 | | 87.88 | .087 | 0.88 | .098 | 1.001 |
| 9 | 85 | 15 | 2 | 1 | 1 | | 23 | | 88.76 | .087 | 1.76 | .098 | 1.982 |
| 10 | 85 | 15 | 2 | 1 | 1 | | 23 | | 90.52 | .087 | 3.52 | .096 | 3.888 |
| 11 | 85 | 15 | 2 | | | | 26 | | 87.00 | .087 | 0.00 | .100 | 0.000 |
| 12 | 85 | 15 | 2 | | | | 26 | | 89.00 | .087 | 2.00 | .097 | 2.247 |
| 13 | 85 | 15 | 2 | | | | 26 | | 96.00 | .087 | 9.00 | .090 | 9.375 |
| 14 | 85 | 15 | 2 | | | | 26 | | 105.0 | .087 | 18.00 | .082 | 17.142 |
| 15 | 95 | 5 | 2 | | | | 26 | | 110.7 | .087 | 23.7 | .078 | 21.409 |
| 16 | 85 | 15 | 2 | | 0.6 | 0.3 | 26 | | 87.09 | .2175 | .09 | .249 | 0.103 |
| 17 | 85 | 15 | 2 | | 0.6 | 0.3 | 26 | | 87.22 | .2175 | .22 | .249 | 0.252 |
| 18 | 85 | 15 | 2 | | 0.6 | 0.3 | 26 | | 87.45 | .2175 | .45 | .248 | 0.514 |
| 19 | 85 | 15 | 2 | | 0.6 | 0.3 | 26 | | 87.22 | .3045 | .22 | .349 | 0.252 |
| 20 | 85 | 15 | 2 | | 0.6 | 0.3 | 26 | | 87.45 | .3045 | .45 | .348 | 0.514 |
| 21 | 85 | 15 | 2 | | 0.6 | 0.3 | 26 | | 87.09 | .435 | .09 | .499 | 0.103 |
| 22 | 85 | 15 | 2 | | 0.6 | 0.3 | 26 | | 87.22 | .435 | .22 | .498 | 0.252 |
| 23 | 85 | 15 | 2 | | 0.6 | 0.3 | 26 | | 87.45 | .435 | 45 | .497 | 0.514 |
| 24 | 85 | 15 | 2 | | 0.7 | 0.35 | 29 | 113 | | .113 | 0.0 | 0.1 | 0.00 |
| 25 | 85 | 15 | 2 | | 0.7 | 0.35 | 29 | 113 | | .565 | 0.0 | 0.5 | 0.00 |
| 26 | 85 | 15 | 2 | | 0.7 | 0.35 | 29 | 113 | | .565 | 0.5 | 0.5 | 0.5 |
| 27 | 85 | 15 | 2 | | 0.7 | 0.35 | 29 | 113 | | 1.13 | 0.0 | 1.0 | 0.0 |
| 28 | 85 | 15 | 2 | | 0.7 | 0.35 | 29 | 113 | | 1.13 | .565 | 1.0 | 0.5 |

| | Percent BAP and H. C. in isocyanate combined | Equivalent of tertiary amine in system | Equivalent of BAP | Equivalent of H.C | Equivalent of BAP and H.C. combined | Equivalent of BAP/tertiary amine salt |
|---|---|---|---|---|---|---|
| Example: | | | | | | |
| 1 | 0.100 | 0.4237 | 0.00 | .00238 | .00238 | 0.00 |
| 2 | 1.223 | 0.4237 | 0.00707 | .00238 | .00945 | .167 |
| 3 | 2.372 | 0.4237 | .11414 | .00238 | .01652 | .338 |
| 4 | 5.447 | 0.4237 | .02828 | .00238 | .03066 | .6675 |
| 5 | 5.477 | 0.4237 | .3535 | .00238 | .03773 | .8343 |
| 6 | 6.484 | 0.4237 | .04242 | .00238 | .0448 | 1.001 |
| 7 | 0.100 | .15206 | 0.00 | .00238 | .00238 | 0.000 |
| 8 | 1.099 | .15206 | .00628 | .00238 | .00866 | .0413 |
| 9 | 2.080 | .15206 | .01257 | .00238 | .01495 | .0827 |
| 10 | 3.984 | .15206 | .0251 | .00238 | .002748 | .1651 |
| 11 | 0.100 | .127 | .0000 | .00238 | .00238 | 0.00 |
| 12 | 2.344 | .127 | .01428 | .00238 | .01666 | 0.1124 |
| 13 | 9.465 | .127 | .06428 | .00238 | .0666 | 0.506 |
| 14 | 17.224 | .127 | .12857 | .00238 | .13095 | 1.112 |
| 15 | 21.487 | .04237 | .16928 | .00238 | .17166 | 3.9953 |
| 16 | 0.352 | .139 | .00064 | .00596 | .0066 | .0046 |
| 17 | 0.501 | .139 | .00157 | .00596 | .00753 | .01129 |
| 18 | 0.762 | .139 | .00321 | .00596 | .00917 | .02309 |
| 19 | 0.601 | .139 | .00157 | .00834 | .00991 | .01129 |
| 20 | 0.862 | .139 | .00321 | .00834 | .01155 | .02309 |
| 21 | 0.602 | .139 | .00064 | .01192 | .01256 | .0046 |
| 22 | 0.750 | .139 | .00157 | .01192 | .01349 | .01129 |
| 23 | 1.111 | .139 | .00321 | .01192 | .01513 | .02309 |
| 24 | 0.1 | .141 | .0000 | .00309 | .00309 | .0000 |
| 25 | 0.5 | .141 | .0000 | .01549 | .01549 | .0000 |
| 26 | 1.0 | .141 | .00403 | .11549 | .01952 | .0286 |
| 27 | 1.0 | .141 | .0000 | .03098 | .03098 | .0000 |
| 28 | 1.5 | .141 | .00403 | .03098 | .0350 | .0286 |

| | Equivalent of BAP/tertiary amine and BAP/H.C. salt combined | Cream time, seconds | Rise time, seconds | Density, lbs./ft.³ | Exotherm, °C. | Fissures | Discoloration | Shrinkage | | |
|---|---|---|---|---|---|---|---|---|---|---|
| | | | | | | | | −10° F. | −40° F. | −70° F. |
| Example: | | | | | | | | | | |
| 1 | 0.056 | 120 | 480 | 2.1 | 110 | No | Yes | Yes | Yes | Yes. |
| 2 | 0.223 | 150 | 720 | 2.1 | 110 | No | No | No | No | No. |
| 3 | .3899 | 90 | 600 | 2.1 | 110 | No | No | No | No | No. |
| 4 | .7236 | 75 | 510 | 2.1 | 110 | No | No | No | No | No. |
| 5 | .8905 | 75 | 570 | 2.1 | 110 | No | No | No | No | No. |
| 6 | 1.0574 | 80 | 360 | 2.2 | 110 | Yes | No | No | No | No. |
| 7 | .01565 | 8 | 85 | 2.6 | 110 | No | Yes | Yes | Yes | Yes. |
| 8 | .05695 | 8 | 130 | 2.6 | 110 | No | No | No | No | No. |
| 9 | .09831 | 10 | 130 | 2.6 | 110 | No | No | No | No | No. |
| 10 | .18071 | 6 | 130 | 2.6 | 110 | No | No | No | No | No. |
| 11 | .01874 | 35 | 600 | 2.2 | 110 | No | Yes | Yes | Yes | Yes. |
| 12 | .1312 | 29 | 660 | 2.1 | 110 | No | No | No | No | No. |
| 13 | .5244 | 19 | 340 | 2.1 | 110 | Yes | No | No | No | No. |
| 14 | 1.0311 | 15 | 270 | 2.1 | 110 | Yes | No | No | No | No. |
| 15 | 4.0515 | 45 | 240 | 2.1 | 115 | Yes | Yes | No | No | No. |
| 16 | .04748 | 7 | 115 | 2.2 | 110 | No | Yes | Yes | Yes | Yes. |
| 17 | .05417 | 8 | 160 | 2.2 | 110 | No | Yes | Yes | Yes | Yes. |
| 18 | .0659 | 8 | 160 | 2.2 | 110 | No | No | No | No | No. |
| 19 | .07129 | 10 | 140 | 2.2 | 110 | No | Yes | No | No | No. |
| 20 | .08309 | 10 | 150 | 2.2 | 110 | No | No | No | No | No. |
| 21 | .09035 | 10 | 175 | 2.2 | 110 | No | Yes | No | No | No. |
| 22 | .09705 | 11 | 190 | 2.2 | 110 | No | No | No | No | No. |
| 23 | .10884 | 11 | 200 | 2.2 | 110 | No | No | No | No | No. |
| 24 | .12191 | 16 | 100 | 2.7 | 100 | No | Yes | Yes | Yes | Yes. |
| 25 | .1099 | 30 | 200 | 2.7 | 100 | No | Yes | Yes | Yes | Yes. |
| 26 | .13843 | 32 | 221 | 2.7 | 100 | No | No | No | No | No. |
| 27 | .2197 | 30 | 345 | 2.7 | 100 | Yes | Yes | No | No | No. |
| 28 | .2483 | 30 | 380 | 2.7 | 100 | No | No | No | No | No. |

In the foregoing table Polyol A is an adduct of sorbitol and propylene oxide having an hydroxyl number of about 450; Polyol B is an adduct of diethylene triamine and propylene oxide having an hydroxyl number of about 475; Catalyst A is N,N,N',N' - tetramethyl butane - 1,4-diamine; Catalyst B is N.N-dimethyl amino ethanol; Catalyst C is triethylene diamine; Isocyanate A is

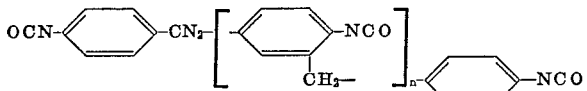

wherein n has an average value of 0.88 and contains about 50% diisocyanate and about 21% triisocyanate, the balance being tetra- and penta-isocyanate sufficient to give n a value of 0.88; Isocyanate B is a mixture of about 50% by weight of a mixture of 80% 2,4- and 20% 2,6-toluylene diisocyanate and about 50% by weight of an isocyanate having the formula

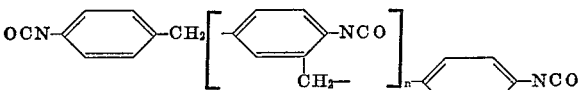

wherein n has an average value of 0.88 and contains about 50% diisocyanate and about 21% triisocyanate, the balance being tetra- and penta-isocyanates sufficient to give n a value of 0.88. The amounts of isocyanates reported in the table include the amount of hydrolyzable chloride and mixture of n-btuyl acid phosphate reported separately in the table. In other words, Isocyanate A or B respectively accounts for all of Component II. BAP when used in the table stands for the mixture of butyl acid phosphates defined above. H.C. stands for hydrolyzable chloride.

It is to be understood that the foregoing working examples are given for the purpose of illustration and that any other suitable polyol, isocyanate, acid phosphate, hydrolyzable chloride or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. In the preparation of a cellular polyurethane plastic by a process which comprises reacting a mixture of from about 5 to 40% by weight of a tertiary nitrogen containing polyol having 2 to 8 —OH groups and a molecular weight of about 175 to 1000, with a polyol which is free of tertiary nitrogen in the presence of a blowing agent, an alkyl silane polysiloxane oxyalkylene block copolymer and an alkyl acid phosphate with an oragnic polyisocyanate, the improvement which comprises using an amount of alkyl acid phosphate within the range of from about 0.2% to about 2% by weight based on the weight of the organic polyisocyanate and an amount of hydrolyzable chloride within the range of from about 0.01% to about 1% based on the weight of the organic polyisocyanate, with the proviso that the reaction mixture contains a total of at least about 0.75 percent by weight of hydrolyzable chloride and acid phosphate combined based on the weight of the organic polyisocyanate.

2. The process of claim 1 wherein said organic polyisocyanate is a mixture of isocyanates having the formula

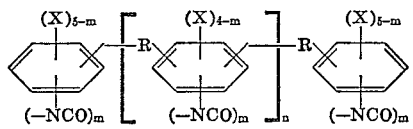

wherein R is an organic radical, X is selected from the group consisting of halogen, lower alkyl and hydrogen and n is 0 to 3.

3. The process of claim 2 wherein R is CH$_2$, X is hydrogen and n has an average value of 0 to 1.

4. The process of claim 1 wherein said organic polyisocyanate is a mixture of from about 10 to 90% toluylene diisocyanate and the balance a polyphenyl polymethylene polyisocyanate containing diisocyanate, triisocyanate and higher polyisocyanates.

5. The process of claim 1 wherein said organic polyisocyanate is a mixture of from about 35 to 50% by weight of toluylene diisocyanate and the balance a polyphenyl polymethylene polyisocyanate having the formula

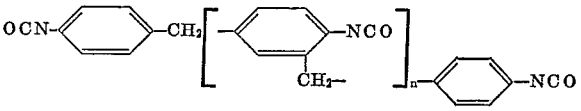

wherein n has an average value of about 0.9.

6. The process of claim 1 wherein said tertiary nitrogen containing polyol is the reaction product of an aliphatic amine and an alkylene oxide.

7. The process of claim 1 wherein said tertiary nitrogen containing polyol is the reaction product of propylene oxide and diethylene triamine.

8. In the preparation of a cellular polyurethane plastic by a process which comprises reacting a mixture of from about 5 to 40% by weight of a tertiary nitrogen containing polyol having 3 to 8 —OH groups and a molecular weight of 100 to 1000, with a polyol which is free of tertiary nitrogen in the presence of a blowing agent, an alkyl silane polysiloxane oxyalkylene block copolymer and an alkyl acid phosphate with an organic polyisocyanate, the improvement which comprises mixing said alkyl acid phosphate with said organic polyisocyanate and heating the mixture at a temperature up to about 75° C. for about 15 minutes to about 2 hours, the amount of alkyl acid phosphate being within the range of from about 0.2% to about 2% by weight based on the weight of the organic polyisocyanate and an amount of hydrolyzable chloride within the range of from about 0.01% to about 1% based on the weight of the organic polyisocyanate, with the proviso that the reaction mixture contains a total of at least about 0.75% by weight of a hydrolyzable chloride and acid phosphate combined based on the weight of the organic polyisocyanate.

References Cited
UNITED STATES PATENTS

| | | | |
|---|---|---|---|
| 3,029,208 | 4/1962 | Khawam | 260—2.5 |
| 3,034,996 | 5/1962 | Kaplan | 260—2.5 |
| 3,042,631 | 7/1962 | Strandskov | 260—2.5 |
| 3,067,149 | 12/1962 | Dombrow et al. | 260—2.5 |
| 3,105,063 | 9/1963 | Damusis | 260—77.5 |
| 3,245,922 | 4/1966 | Worsley et al. | 260—2.5 |

FOREIGN PATENTS
661,534  4/1963  Canada.

OTHER REFERENCES
Hampton et al.: Oil and Colour Chemists Association Journal, vol. 43, No. 2, February 1960, pp. 116–117 relied on.

Saunders et al.: Polyurethanes, part II, Interscience, New York (1964), pp. 15–19.

DONALD E. CZAJA, Primary Examiner

H. S. COCKERAM, Assistant Examiner

U.S. Cl. X.R.

106—122; 161—159; 260—45.7, 75